Aug. 18, 1959      C. J. KROGEL      2,900,176
AUTOMATIC FLUID DISTRIBUTION SYSTEM
Filed April 10, 1957      2 Sheets-Sheet 1
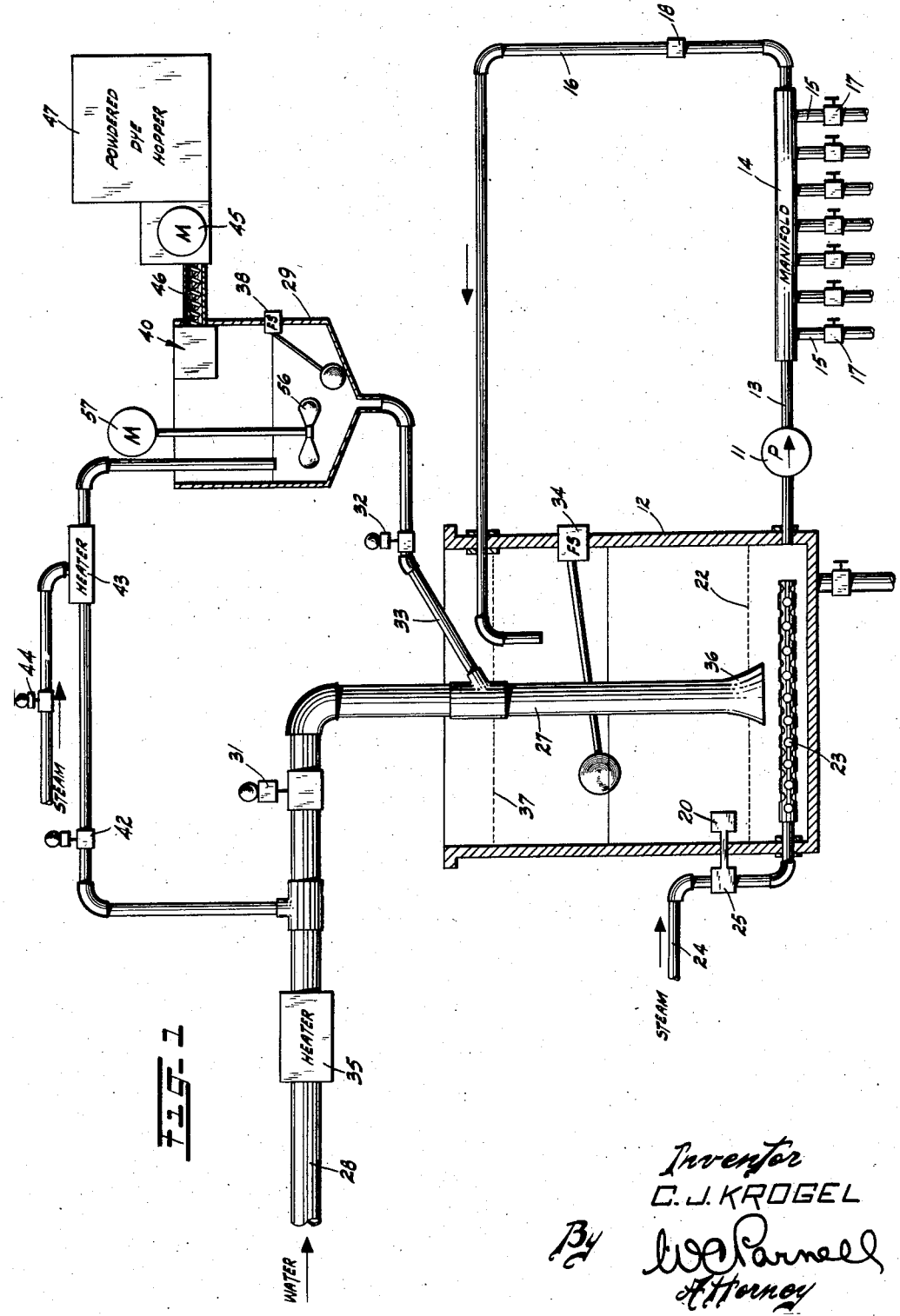
Inventor
C. J. KROGEL

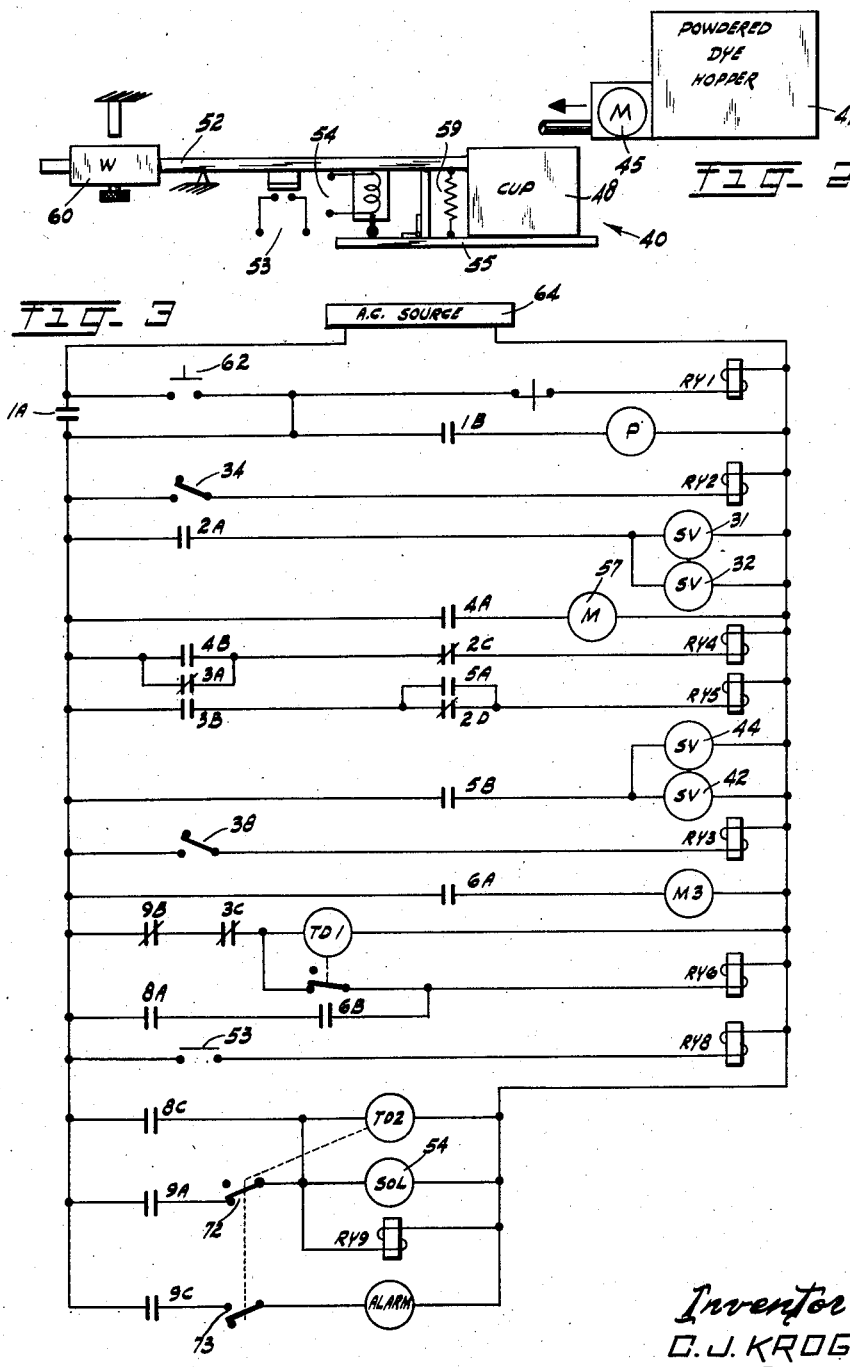

United States Patent Office 2,900,176
Patented Aug. 18, 1959

2,900,176

AUTOMATIC FLUID DISTRIBUTION SYSTEM

Christopher J. Krogel, Cranford, N.J., assignor to Western Electric Company, New York, N.Y., a corporation of New York Application April 10, 1957, Serial No. 651,898

3 Claims. (Cl. 259—95)

This invention relates to a fluid distribution system and particularly to a system for automatically mixing and continuously feeding fluids such as dyes to apparatus.

In mixing and distributing fluid mixtures or solutions, a problem generally encountered is that of obtaining and maintaining uniform concentrations. For industrial applications, most mixtures and solutions are prepared in what is known as a batch-mixing process whereby accurately measured quantities of the substances are dumped together and mixed to assure that a desired concentration is obtained at the outset. A main disadvantage of such batch mixing is that it does not lend itself to a continuous process.

In the specific case of coloring pulp insulation for use in wire insulating lines, powdered dye has been mixed with water in such a batch-mixing operation. In this operation two large-capacity supply tanks were utilized for mixing and supplying the dye solution to a distributor or manifold feeding the individual wire insulating lines. One tank was normally connected to and supplied the diluted dye to the manifold while the other was removed from service and a batch of dye solution prepared therein so that when the other tank ran dry, it could be switched manually to the manifold and the empty tank made available for preparing a new batch therein. The preparation of each batch was carried out manually and consisted in weighing out a quantity of powdered dye and mixing it in a definite quantity of water. This system, besides requiring considerable operator attention and maintenance, also took up a great deal of floor space, both for the two large supply tanks and for access thereto by the operator. In addition, the weighing operation was both an unhealthy and disagreeable one due to the dusty nature of the dry powdered dye. Another disadvantage of such a batch system, which caused one of the principal maintenance problems, was that the dye settled out of solution, diluting the remaining solution and also clogging the lines, particularly in the manifold or distributor feeding the individual wire insulating lines. This necessitated periodic flushing of the parts of the system, during which time it was necessary to shut down the wire insulating lines and interrupt production.

The term "solution" in this specification and claims is used in its broad sense to include mixtures as well as true solutions.

The principal object of the invention is an improved fluid mixing and supply system, the operation of which is completely automatic.

In general, the system operates in what may be called a rapid batch cycle in which a supply tank is automatically refilled when needed with a charge of concentrated solution and diluting liquid therefor which are pre-mixed as they are discharged into the tank and constantly agitated and heated to maintain the diluted concentration substantially uniform such that the diluted solution may be fed continuously to apparatus.

In a preferred embodiment of the invention as applied to an automatic dye system, a single main supply tank is utilized from which the diluted dye solution is fed to distributing apparatus. Measured amounts of hot water and powdered dye are automatically fed from a water supply line and a dye supply hopper, respectively, into a dissolving tank where they are mixed to provide an available charge or batch of concentrated dye solution. When the diluted solution in the main supply tank is lowered to a minimum level, the pre-mixed concentrated solution and additional hot water are simultaneously and automatically fed into the main tank through a common mixing pipe. The rate at which the water is fed into mixing relation with the concentrated solution is such that the dye is substantially full diluted in the required proportion of dye to water as it enters the main supply tank. When the diluted solution in the tank reaches a maximum level, the refilling liquids are shut off and the preparation of a new charge of concentrated solution is started in the dissolving tank.

An important feature of the invention is means for automatically delivering accurately measured charges of powdered dye to the dissolving tank when needed for the preparation of concentrated dye solution therein. It is to be noted that past attempts to feed powdered dye at a uniform rate in mixing operations have been complicated due to the propensity of the dye to absorb moisture and form in hard lumps.

Another important feature of the invention is means for preventing the dye from settling out of solution in the main supply tank and the distributor, thereby eliminating the need for periodic shutdowns for flushing dye sludge from the apparatus.

These and other features of the invention will be more fully understood from the following detailed description taken in conjunction with the accompanying drawing, in which:

Fig. 1 is a schematic diagram of a preferred embodiment of the system as may be used to supply diluted dye solution to pulp supply lines to wire insulating apparatus;

Fig. 2 is a diagram of the device for discharging accurately measured amounts of powdered dye from the storage hopper, and Fig. 3 is a detached-contact schematic diagram of the control circuit for the system.

Referring now to the drawing, a pump 11 feeds diluted dye solution from a seventy-five gallon supply tank 12 through a pipe 13 to a distributor or manifold 14 for supplying the solution to distribution lines 15 feeding the individual pulp insulating apparatus in the wire insulating lines. A recirculation path 16 is provided for returning a portion of the solution back to tank 12, the pump delivering the dye solution at a substantially faster rate than it is needed in the lines 15. This recirculation of the dye solution prevents the dye from settling out in the pipe 13 and the manifold 14 and also serves to keep the dye in the tank 12 in constant motion and therefore well mixed. Valves 17 in the lines 15 make it possible to shut off the dye supply to any of the insulating lines as required when certain individual lines are not in use. A pressure sensitive valve 18 in the recirculation path permits setting the recirculation rate in accordance with the number of lines 15 being fed from the manifold 14 so that the dye supplied to the lines 15 which are in use may be maintained substantially at a constant pressure. A hollow perforated member 23 in the bottom of the tank 12 is supplied with live steam from a supply line 24 to agitate the dye solution and also maintain its temperature at a level sufficient to keep the dye in solution. When the solution in the tank 12 is lowered to a minimum level, as indicated by dashed line 22, it is automatically refilled by the actuation of a toggle-type float switch 34 which causes solenoid valves 31 and 32 to open, permitting water from a supply line 28 and pre-mixed concentrated dye solution from a five-gallon dissolving tank 29 to flow into a common mixing pipe 27 and discharges from the outwardly flared end 36 directly over the steam supply member 23. The water supply line 28 may be any supply line of substantially constant pressure so that whenever the valve 31 is opened, the rate at which the water flows into the mixing pipe 27 will be substantially uniform. A conventional heat exchanger or water heater 35 in the line 28 raises the temperature of the water passing therethrough to a substantially constant value. The valves 31 and 32 and the associated piping for supplying the water and the concentrated dye to the mixing pipe 27 are proportioned so that the water fed into mixing relation with the concentrated solution is approximately in the proper proportion to result in the dilution desired.

Maximum steam is supplied to member 23 when it is needed to produce maximum agitation at the start of the refilling operation, the thermostat control element 20 for valve 25 being located above the low level line 22 and out of the heated solution exposed to the cooler atmosphere at this time. The turbulence resulting from the steam reacting on the solution being discharged over the member 23 assures complete mixture of the concentrated solution and the water coming into the tank 12, thereby making it possible to continuously pump the mixed diluted solution to the manifold during this refilling operation. The solenoid valves 31 and 32 are closed by the operation of the float switch 34 when the tank 12 is filled to an upper maximum level designated by the dashed line 37. Under normal operation, this float switch is actuated just slightly after the storage tank 29 has been emptied. The dilution of the mixture in tank 12 from the steam is negligible due to the normal relatively high discharge rate of the solution to the lines 15.

After a charge of concentrated dye solution has been delivered to the main tank 12 for the refilling operation, a new batch or charge is prepared in the storage tank 29. This operation is prepared by the closing of float switch 38 in the tank 29 when the concentrated dye solution is completely drained from the tank 29 and is triggered by the opening of float switch 34 in tank 12 when it is filled. Pre-heated water for the concentrated solution is obtained from the water supply line 28 and passes through a second heater 43 to increase its temperature in order to keep the dye in the more heavily concentrated mixture in solution. This heater is basically a steam and water mixing valve, steam being supplied thereto through a solenoid valve 44 which is operated simultaneously with solenoid valve 42 in the water supply line. When the water reaches a prescribed maximum level in the storage tank 29, float switch 38 causes the valves 42 and 44 to be closed and starts a dye feed motor 45 to drive a screw feed mechanism 46 to feed powdered dye from a supply hopper 47 into a dye measuring device shown generally in Fig. 1 as box 40, shown in detail in Fig. 2. The motor 45 feeds dye (generally intermittently due to the lumpy nature of the dye supplied to the screw in the hopper) into a cup member 48 on the end of a counterweighted pivoted member 52 until a prescribed amount of dye has been deposited therein. The weight of the dye deflects the pivoted member downwardly sufficiently to close the contacts of a limit switch 53. Switch 53 causes the feed motor to stop and a solenoid 54 to be actuated to open the hinged bottom closure member 55 for the cup. The contents of the cup 48 are thereupon dropped into the water in the storage tank to be agitated and mixed with the water by means of the propeller-type agitator 56, the motor 57 for which is energized simultaneously with the energizing of the feed motor 45. When the dye has been discharged from the cup, the solenoid 54 is de-energized and a spring 59 on the member 52 pulls the bottom member 55 shut. The counterweight 60 may be moved to various positions along member 52 as required to measure out greater or lesser amounts of dye in the event it is desired to change the concentration of the dilute dye fed to the manifold.

While the automatic operation of the system has been described in general above, a more detailed description will now be given in connection with the explanation of the control circuit shown in Fig. 3. In the circuit, relays are designated "RY" and the detached contacts of the relays are prefixed by the number of the relay controlling them.

Operation of the system is initiated by momentarily depressing push button switch 62 to complete the energizing circuit for relay RY-1 across the alternating current source 64. The relay locks up through operated contacts 1-A and its contacts 1-B close the energizing circuit for pump 11. The dye solution is pumped from the tank 12 to the manifold 14 until the solution in the tank drops to the minimum level 22 when the toggle-type float switch 34 closes to complete the energizing circuit for relay RY-2. The operated contacts 2-A of relay RY-2 close the energizing circuit for solenoid valves 31 and 32 which open to discharge heated water and concentrated dye solution from the supply line 28 and the small storage tank 29, respectively, through the mixing pipe 27 into the large supply tank 12. As mentioned above, the interaction of the streams coming together in the mixing pipe mixes the two sufficiently so that pump 11 may continue to deliver dye solution of substantially uniform concentration from the main tank to the manifold while a new batch of dilute dye is mixed in the pipe 27 and discharged into the tank.

When storage tank 29 is emptied, slightly before the large tank 12 is filled to its maximum level line 33, the toggle-type float switch 38 is actuated to close the energizing circuit for relay RY-3. Contacts 3-A open to prevent the operation of the agitator motor 57 when the large tank A is filled and its float switch 34 opens to release relay RY-2, reclosing its contacts 2-C. Contacts 3-B of relay RY-3 close to prepare relay RY-5 for operation when relay RY-2 is released and contacts 3-C open to de-energize and prepare a timer TD-1 for its timing cycle to permit one complete dye feeding cycle to take place after the small tank 29 has been filled regardless of the level of the solution in the large tank 12.

When the large tank 12 is filled, its float switch 34 opens, de-energizing relay RY-2 to close the solenoid valves 31 and 32 and, in addition, its contacts 2-D reclose to operate relay RY-5, which locks up through its contacts 5-A. Operated contacts 5-B thereupon energize and open solenoid valves 42 and 44 which starts water flowing into the dissolving tank 29 and opens the steam supply to the heater in this water supply line. When tank 29 is full, float switch 38 opens to de-energize relay RY-3, contacts 3-A re-close to energize relay RY-4, whose contacts 4-A close to energize and start the agitator motor 57. Contacts 3-C of relay RY-3 also re-close to start the timer TD-1 and energize dye feed control relay RY-6. Lock-up contacts 6-B close to hold the relay RY-6 operated after the timer TD-1 times out (after approximately one second) and opens its contacts. The motor 45 drives the feed screw in the powdered dye supply hopper to feed powdered dye into the cup 48 on the pivoted counterweighted member 52. Dye is fed until the weight of the dye in the cup 48 unbalances the member 52 such that the cup is depressed sufficiently to close limit switch 53 and energize relay RY-8. Contacts 8-A thereupon open to release relay RY-6 and thereby stop the dye feed motor 45. Operated contacts 8-C close the energzing circuit for a second timer TD-2, which starts timing, and also energizes the solenoid 54 which operates to open the cup 48 and allow the dye to slide out into the tank 29. Contacts 8-C also close the energizing circuit for a relay RY-9 which operates and locks up through contacts 9-A to hold the solenoid 54 energized through the normally closed contacts 72 of the timer TD-2. When the dye is dumped, the counterweight on the member 22 causes the cup to be lifted, thereby opening the limit switch 53 to de-energize relay RY-8. The normally closed contacts 72 of the timer TD-2 hold the solenoid 54 and the relay RY-9 energized until after a five-second time delay to permit the cup to empty even though the switch 53 has previously been opened, when timer TD-2 times out to de-energize the solenoid 54 and relay RY-9.

In the event the limit switch 53 remains closed, for example, if the powdered dye does not flow out of the cup, the solenoid 54 and the relay RY-9 will remain energized and hold its contacts 9-C closed. Contacts 9-C are in series with an alarm 74 and normally open contacts 73 of timer TD-2. Then when the timer TD-2 times out, in five seconds after being energized, the alarm circuit is closed through the operated contacts 73 of the timer and the operated contacts 9-C of relay RY-9 to indicate the failure of the apparatus to the operator. As long as the fault persists, relay RY-9 will remain operated and its operated contacts 9-B in the energizing circuit for the dye supply motor 45 will remain open, thereby preventing a subsequent dye feeding operation until the trouble has been cleared.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An automatic dye supply system comprising a main supply tank, agitating means in the tank, a distributor for dispensing dye solution, means for feeding diluted dye solution from the tank to the distributor, means including a pressure regulating valve for returning a portion of the solution supplied to the distributor back to the tank to keep the solution in circulation, a dissolving tank for concentrated dye solution having means for mixing solutions therein, a source of diluting liquid, a supply hopper for powdered dye, means for feeding prescribed amounts of diluting liquid and powdered dye to the dissolving tank from the source and hopper, respectively, means including a first valve and a mixing pipe for discharging diluting liquid from the source to the supply tank within the effective area of the agitator, means including a second valve for discharging concentrated dye solution from the dissolving tank to the mixing pipe, means operative when the diluted dye in the main supply tank is lowered to a minimum level for opening the valves to discharge concentrated dye solution and diluting liquid into the mixing pipe, the rates of flow of the concentrated solution and the diluting liquid through the valves being approximately in the ratio required for the diluted solution, means operative when the diluted solution reaches a maximum level in the supply tank for closing the valves and means operative when the valves are closed to actuate the powdered dye and diluting liquid feeding means for the dissolving tank.

2. In a liquid dye solution distribution system, a supply tank, a manifold for distributing dye solution, means including a pump for feeding diluted dye solution from the tank to the manifold, means for recirculating a portion of the dye fed to the manifold back to the tank to keep the dye solution in constant motion and prevent the dye from settling out of solution, a hollow member, having a plurality of apertures therein, mounted in the bottom of the tank, means for supplying steam to the member for heating and agitating dye solution in the tank, a supply of diluting liquid, a source of concentrated dye solution, a mixing pipe for feeding liquid into the tank, said pipe having its discharge end over the hollow member, means including a level responsive switching device for feeding diluting liquid and concentrated dye solution into the mixing pipe to refill the tank when the dye solution in the tank is lowered to a predetermined low level, and a thermostat controlled valve in the steam supplying means having its control element mounted in the tank and normally submerged in the heated solution at a location above said predetermined low level to automatically increase the rate of supplying steam to the aperture member to increase turbulence in the remaining solution when the level of the solution is lowered to the predetermined level and refilling solution is discharged into the tank.

3. An automatic dye supply system comprising a supply tank, agitating means in the tank, a distributor for dispensing dye solution, means for feeding diluted dye solution from the tank to the distributor, means including a pressure sensitive valve for returning a portion of the solution supplied to the distributor back to the tank to keep the solution in circulation, a dissolving tank for concentrated dye solution, a source of diluting liquid, means including a first valve and a mixing pipe for discharging diluting liquid from the source to the supply tank within the effective area of the agitator, means including a second valve for discharging concentrated dye solution from the dissolving tank to the mixing pipe, means operative when the diluted dye in the supply tank is lowered to a prescribed minimum level for opening the valves to discharge concentrated dye solution and diluting liquid into the mixing pipe, the rates of flow of the concentrated solution and the diluting liquid through the valves being approximately in the ratio required for the diluted solution, means operative when the diluted solution reaches a maximum level in the supply tank for closing the valves, and means for automatically preparing a charge of concentrated dye solution in the dissolving tank after the supply tank is refilled comprising, an agitator in the storage tank, a motor for driving the agitator, means including a third valve for feeding liquid from the source to the dissolving tank, means including a switch responsive to the level of liquid in the supply tank for actuating said third valve to fill the dissolving tank to a predetermined level, a supply hopper for powdered dye, a pivotally mounted member having a counterweight on one side of the pivot and a receptacle on the other side, a movable bottom member in the receptacle, means for moving the bottom member, means operable when the dissolving tank is filled for energizing the motor to drive the agitator and for feeding dye from the hopper to the receptacle, switching means responsive to the weight of dye in the receptacle for stopping the dye feeding means and for actuating the moving means for the bottom member to open the receptacle and dump dye therefrom into the dissolving tank, and means operative after the dye is dumped to re-close the receptacle.

References Cited in the file of this patent

UNITED STATES PATENTS

| | | |
|---|---|---|
| 1,468,739 | Paterson | Sept. 25, 1923 |
| 2,126,552 | Holloway | Aug. 9, 1938 |
| 2,463,995 | Nielsen | Mar. 8, 1949 |
| 2,544,155 | Harkenrider | Mar. 6, 1951 |
| 2,555,250 | Schroeder | May 29, 1951 |
| 2,608,392 | Bowman | Aug. 26, 1952 |
| 2,739,608 | Brower | Mar. 27, 1956 |
| 2,758,716 | Oswald | Aug. 14, 1956 |
| 2,776,119 | Joffe et al. | Jan. 1, 1957 |
| 2,792,912 | Kangas | May 21, 1957 |
| 2,808,316 | Hall | Oct. 1, 1957 |